United States Patent [19]

Rubey

[11] 4,239,014
[45] Dec. 16, 1980

[54] SUSPENDED DROPLET SHOCK DETECTOR
[75] Inventor: Ulyss R. Rubey, Lewisville, Tex.
[73] Assignee: Detectors, Inc., Graham, Tex.
[21] Appl. No.: 5,439
[22] Filed: Jan. 22, 1979
[51] Int. Cl.³ ............................................ G01P 15/03
[52] U.S. Cl. .................................................. 116/203
[58] Field of Search .......................... 116/203; 73/492; 116/227; 200/61.47

[56] References Cited
U.S. PATENT DOCUMENTS

| 1,975,824 | 10/1934 | Blackwood | 73/492 |
| 2,601,440 | 6/1952 | Kerrigan | 73/492 X |
| 2,843,076 | 7/1958 | Cook et al. | 116/203 |
| 4,068,613 | 1/1978 | Rubey | 116/203 |

OTHER PUBLICATIONS
Publ. "Molecular Forces and Surface Tension", in Kimballs College Textbook of Physics, Waterman, pp. 227–234 (© 1911).

Primary Examiner—Daniel M. Yasich
Attorney, Agent, or Firm—Wofford, Fails & Zobal

[57] ABSTRACT

An apparatus which responds to a predetermined acceleration wherein a droplet of liquid is suspended by a holding means which prevents the droplet from escaping, except that when an acceleration of the holding means occurs which is greater than a predetermined acceleration, then at least a portion of the droplet escapes from the holding means.

4 Claims, 2 Drawing Figures

SUSPENDED DROPLET SHOCK DETECTOR

BACKGROUND OF THE INVENTION

1. Field of the Invention

This invention relates to apparatus which respond to a predetermined acceleration. More particularly it relates to devices for detecting if a shock or force or acceleration has occurred which could harm the item to which the device is associated or attached.

2. Description of the Prior Art

The prior art has seen the development of a wide variety of complex electronic, mechanical, and magnetic apparatus delicate enough that shocks, as small as those received during transportation, can cause the apparatus to malfunction or fail. Often these failures are not easily noticed by examination of the apparatus itself and a separate shock detection device is, therefore, desired. An example of a delicate apparatus of the type described is a magnetic disc package used to store large amounts of information for access by computers. If these discs receive a large enough shock then a magnetic disruption of the information contained on the disc can occur. This disruption can create false information on the disc that neither a visual examination nor a computer examination can detect. When this occurs the disc should either be discarded or the information on it corrected.

Disruption on a disc package will not occur if a shock or acceleration is less than a particular amount; this amount depending on how much safety margin is required and the type of shock or acceleration received.

In the past, elaborate acceleration detectors that graphically recorded acceleration were used to check for possible damage to delicate apparatus. These detectors electronically monitored the movements of a pendulum or other mass and that information was converted to a graph.

Another acceleration monitor is shown in U.S. Pat. No. 4,068,613. This device used a deformable reservoir in which an interfacial barrier is ruptured above a predetermined shock, or acceleration. In the commercial embodiment the device of U.S. Pat. No. 4,068,613 employed a droplet in an enclosed capillary tube. The droplet is held away from the tube ends by slugs of air or air plugs. If a great enough acceleration occurs then the droplet or a portion of the droplet penetrates the air plug to wet an end of the tube. The commercial devices of U.S. Pat. No. 4,068,613 required careful control of the diameters and the relative interfacial tensions. Also, the longitudinal capillaries had a slight directional sensitivity.

SUMMARY OF THE INVENTION

It is accordingly an object of the present invention to provide an improved device which responds to a predetermined acceleration without requiring careful and precisely formed diameters of passageways, or capillaries.

It is a further object of the invention to provide a device which responds to a predetermined acceleration, the device being relatively free from directional sensitivity.

In accordance with the present invention there is provided a droplet of liquid suspended by a holding means. The holding means encloses and suspends the droplet such that when an acceleration of the holding means greater than a predetermined acceleration occurs the inertia of the droplet causes at least a portion of the droplet to escape from the holding means.

In a preferred embodiment, the holding means is a coil of wire shaped in a three dimensional configuration. The droplet is suspended within the loops of the coil. When the coil is subjected to acceleration greater, than the predetermined acceleration, the inertia of the droplet causes the droplet or at least a portion of the droplet to escape from its suspension within the coil.

For a further understanding of the invention, and further objects, features and advantages thereof, reference may now be had to the following description taken in conjunction with the accompanying drawings.

DESCRIPTION OF THE PREFERRED EMBODIMENT

Figure 1:
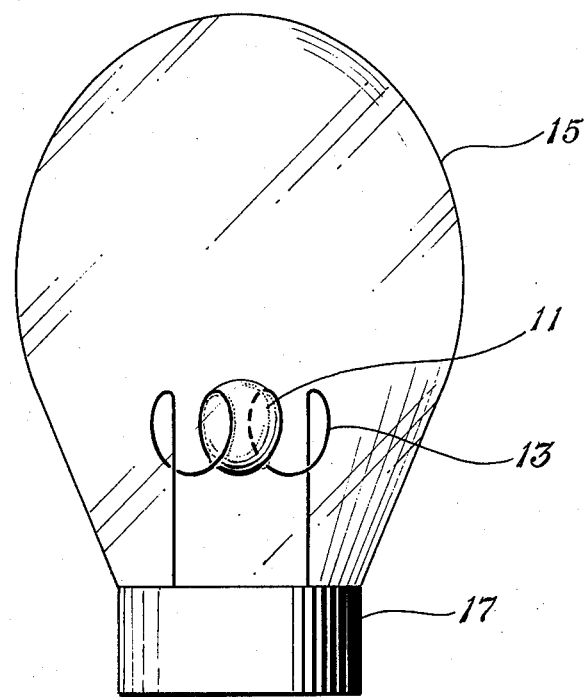
FIG. 1 is a frontal view of the present invention.
Figure 2:
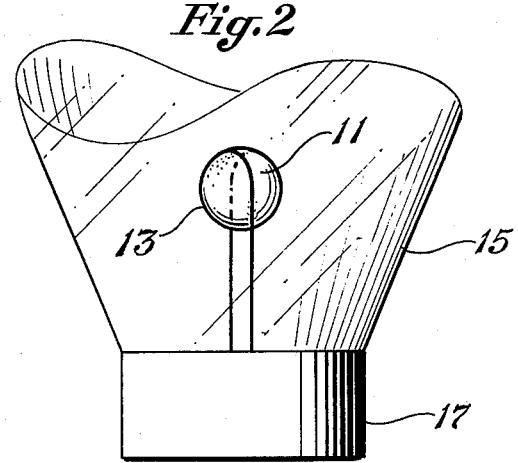
FIG. 2 is a partial side view of the present invention.

Referring to FIG. 1, a frontal view of the invention shows a liquid droplet 11 suspended in a wire coil 13. The coil and droplet are surrounded by a glass bulb 15 and a base 17. The ends of wire coil 13 are connected to base 17 to hold the wire coil inside and away from the walls of bulb 15. If desired, the base may have a covered, adhering surface to facilitate attaching to a case or the like housing the object. Any of the methods of attachment conventionally available; for example, as described in U.S. Pat. No. 4,068,613; may be employed. Together, base 17 and bulb 15 form a sealed container, or housing. As can be seen, the sealed housing carries the liquid holding means and encloses the liquid in a gas-tight seal to prevent evaporation. As indicated hereinafter, the surface of the housing also spreads the liquid droplet that is dislodged from the holding means to afford a visual indication that the acceleration has been received. FIG. 2 shows a side view of the invention; droplet 11 is shown through the end of coil 13.

If an acceleration greater than a predetermined acceleration occurs, then at least a portion of droplet 11 escapes from coil 13. The term "at least a portion of the droplet" includes the entire droplet, of course. The value of the predetermined acceleration depends on several factors which will be discussed later. When droplet 11 escapes, it comes into contact with the walls of bulb 15. This provides a method of revealing to either a present or future observer of the bulb that a shock greater than the predetermined acceleration has occurred. This feature can be enhanced by including a dye or coloring in the liquid of the droplet which liquid will then have increased visibility on the walls of bulb 15. Further enhancement of this feature can be had by frosting or coating the interior wall of bulb 15 to increase the visibility and adhesiveness of the liquid on the wall. Bulbs with frosted interiors, suitable for this purpose, are presently used in small light bulbs and are readily available.

Many liquid compositions are suitable for droplet 11. One example is 60% water, 35% ethylene glycol, and 5% of a water soluble dye. A red dye is useful because of its contrasting color and its connotation as a warning signal. Ethylene glycol is useful since it lowers the freezing point of the liquid so that use in cold environments is allowed.

The composition, size, and shape of the wire coil 13 are also variable. Copper wire with a 0.01 inch diameter has been found suitable. The coil can have a helical shape with a diameter of 0.095 inches. For this coil, a distance of 0.10 inches between loops is suitable. With a coil of this size and shape, the droplet forms roughly a spherical shape with a diameter of approximately 0.10 inches. This configuration and size provides a medium range predetermined acceleration and is almost free from directionality.

Using the coil and droplet as described above, the following table shows this freedom from directionality:

| Direction of Acceleration | No Activation (G's) | Activation (G's) |
| --- | --- | --- |
| 0° | 21.6 | 24.4 |
|    | 24.5 | 25.4 |
| 45° | 23.2 | 25.7 |
|     | 23.2 | 25.3 |
| 90° | 25.5 | 25.7 |
|     | 24.1 | 26.4 |
| 135° | 21.8 | 24.8 |
| 180° | 25.8 | 27.0 |

Minimum activation 24.4
Maximum activation 27.0
Average activation 25.7 ± 1.3 (≈5.06%)

As used above, a G is equal to the acceleration produced by Earth's gravity at sea level. The direction of acceleration is given in angles measured with respect to vertical, as shown in FIG. 1. Thus, a 90° acceleration has a direction of a quarter turn of the coil, i.e. normal to FIG. 1. The above table shows that the small wires of the coil do not significantly alter the force required for escape of the droplet regardless of their orientation with respect to the acceleration. Of course, the application of the acceleration force must be on the base 17 or the bulb 15 and then translated to coil 13 and droplet 11. It is the inertia of droplet 11 which causes its escape from coil 13.

Many factors influence the magnitude of acceleration which will produce an escape of droplet 11 from coil 13. Most obviously, the coil and droplet size influence this magnitude. A larger coil and droplet require a lower acceleration in order to produce an escape. The coil can be made larger, either in diameter or pitch (i.e., the distance between loops), in order to increase the size of droplet 11. The density of the liquid is also a factor; greater density lowering the necessary acceleration.

Another factor is the interfacial tension between the wire and the liquid. If there is a large adhesive force and the interfacial area of this force is large, then adhesion between the wire and droplet dominate the other forces and the strength and area of this force largely determine the acceleration which will produce an escape. Thus, in very small diameter coils where the wire diameter is relatively large, the adhesive force is increased. The type of liquid and wire can also be changed to vary the adhesive force.

On the other hand, where the wire contacts only a relatively small area of the surface of the droplet, then adhesion is not such a large factor. In this situation, the surface tension (interfacial tension of the gas in the bulb and the liquid) of the liquid becomes a dominant factor. Since surface tension urges the droplet to form a sphere and the sphere is enclosed by the configuration of the coil, an escape acceleration must be large enough to deform the surface to an escapable shape. In this way surface tension can prevent escape of the droplet from the coil prior to the predetermined acceleration.

Yet another factor is the manner in which the coil is suspended in the bulb. For example, the length of the wires leading from the coil to the base will be a factor since they bend with accelerations and hence can have a dampening effect. This dampening might be used to decrease the responsiveness to short term accelerations. The support wires shown in the Figs. have lengths of approximately 0.30 inches.

In operation, the base 17 or bulb 15 of the acceleration detector of this invention can be attached to an acceleration sensitive device, such as a magnetic disc package. If the disc receives shocks lower than the predetermined force of the attached detector then no escape of droplet 11 occurs. If, however, an acceleration greater than the predetermined acceleration occurs then the inertia of the droplet causes at least a portion of droplet 11 to escape from coil 13. This liquid will contact the wall of bulb 15 and be visible to a viewer from the time of that acceleration forward. Therefore, it can be determined whether the disc has ever received a shock great enough to have possibly caused damage.

There are a wide variety of configurations that can be employed for the holding means. For example, a pair of parallel rings can be employed to hold the droplet. Also a foraminous, liquid "droplet" containing, hollow sphere in which the apertures are large enough to allow the requisite "at least a portion of the droplet" to escape from the sphere when subjected to the shock greater than the predetermined acceleration.

The bulb 15 may have any shape or size; preferably, small enough that a substantial portion is wet when the droplet escapes from the coil. Preferably, also, the bulb 15 and base 17 are small and unobtrusive and readily attachable.

The foregoing disclosures and the showings made in the drawings are merely illustrative of the principles of this invention and are not to be interpreted in a limiting sense.

What is claimed is:
1. An apparatus which responds to an acceleration greater than a predetermined acceleration, which comprises:
   a. a droplet of liquid within a container;
   b. a holding means holding said droplet; said holding means contacting only a relatively small amount of surface less than the total surface of said droplet and yet in a manner which encloses and suspends said droplet predeterminedly spaced from a bottom wall of said container such that the mass and surface tension of said droplet forms a deformable reservoir at acceleration below said predetermined acceleration and such that when an acceleration greater than said predetermined acceleration is experienced, the inertia of the drop of liquid causes at least a portion of the drop of liquid to escape from said holding means; and
   c. said holding means being attached to said container; said container sealingly surrounding said holding means such that when at least a portion of said droplet escapes from said holding means said portion will contact said container; said container presenting a visual sign upon being contacted by said portion.
2. The apparatus of claim 1 wherein the portion of said holding means which contacts the surface of said droplet comprises a wire shaped in a three dimensional enclosing configuration.

3. The apparatus of claim 1 wherein said enclosing configuration is a coil.

4. An apparatus which responds to an acceleration greater than a predetermined acceleration, which comprises:
   a. a droplet of liquid within a container;
   b. a holding means holding said droplet by adhesion between said droplet and said holding means; said holding means holding said droplet such that an acceleration greater than a predetermined acceleration of the holding means causes at least a portion of said droplet of liquid to escape from said holding means; said holding means comprising a wire shaped in a three dimensional enclosing configuration and predeterminedly spaced from a bottom wall of said container, the droplet being within the enclosing configuration; and
   c. said container scalingly enclosing said droplet and holding means and providing a visual indication when said at least a portion of said droplet escapes from said holding means.

* * * * *